Sept. 9, 1947.  A. ZECH  2,427,320
FLUID STRAINER CONSTRUCTION
Filed Jan. 6, 1944  3 Sheets-Sheet 1

INVENTOR.
ALFRED ZECH
BY Swan, Frye, & Hardesty

ATTORNEYS

Sept. 9, 1947.   A. ZECH   2,427,320
FLUID STRAINER CONSTRUCTION
Filed Jan. 6, 1944   3 Sheets-Sheet 2
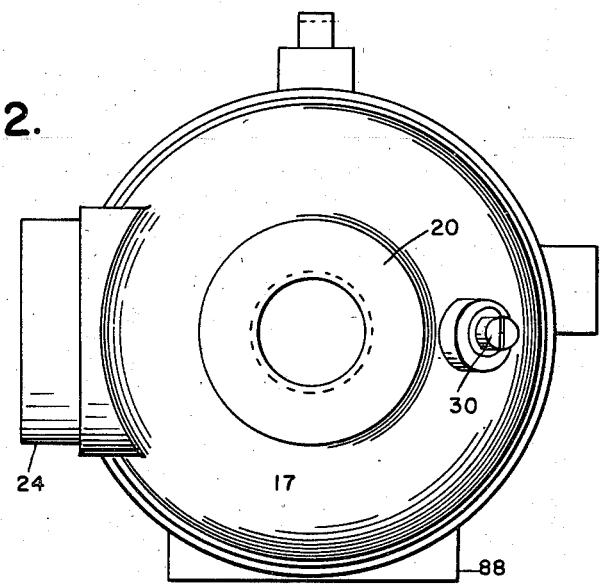
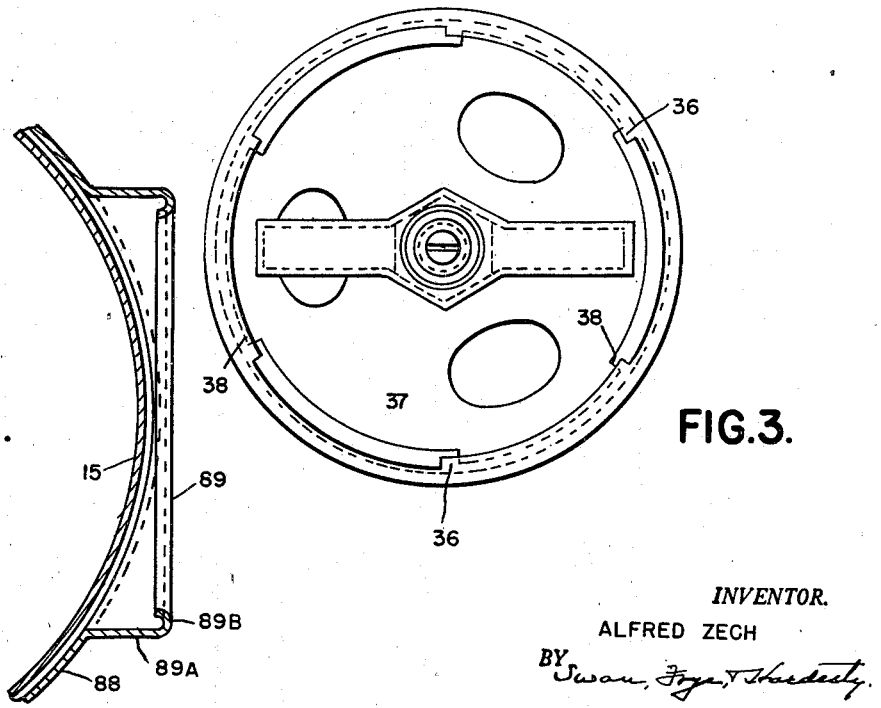
INVENTOR.
ALFRED ZECH
BY Swan, Frye, & Hardesty
ATTORNEYS Patented Sept. 9, 1947

2,427,320

UNITED STATES PATENT OFFICE 2,427,320

FLUID STRAINER CONSTRUCTION

Alfred Zech, Detroit, Mich., assignor to Industrial Wire Cloth Products Corporation, Wayne, Mich., a corporation of Michigan Application January 6, 1944, Serial No. 517,179

2 Claims. (Cl. 210—165)

This invention relates to fluid strainers.

An object of this invention is to provide a strainer assembly wherein the casing may be built up from sheet metal, the parts forming the casing being brazed or welded together so as to provide for a minimum of machining and a considerable reduction in weight.

Another object of this invention is to provide a strainer assembly which is so constructed and arranged that it can be secured to a suitable support and the casing adjusted relative to the support to thereby position the pipe connections in their proper places, the adjustability of the casing eliminating the necessity of providing numerous models with particularly positioned connections.

A further object of this invention is to provide in a strainer assembly an improved means for securing the screen in the casing so that the screen may be readily removed for cleaning or other purposes.

A further object of this invention is to provide an improved strainer assembly embodying a novel sediment sump or trap, the trap carrying a flange for receiving a sealing ring and the latter seating on a seat struck inwardly from the lower end of the casing.

A further object of this invention is to provide a strainer assembly in which the casing is formed out of stamped sheet metal, thereby producing a strong and light weight casing which can be quickly and accurately assembled on a production line. Other objects and advantages will appear to those skilled in the art upon reference to the following description and the accompanying drawings in which Fig. 1 is a view in elevation of the device.

Fig. 2 is a top plan view.

Fig. 3 is a bottom plan of the device.

Fig. 5 is a section on line 5—5 of Fig. 1.

Figures 1, 6:
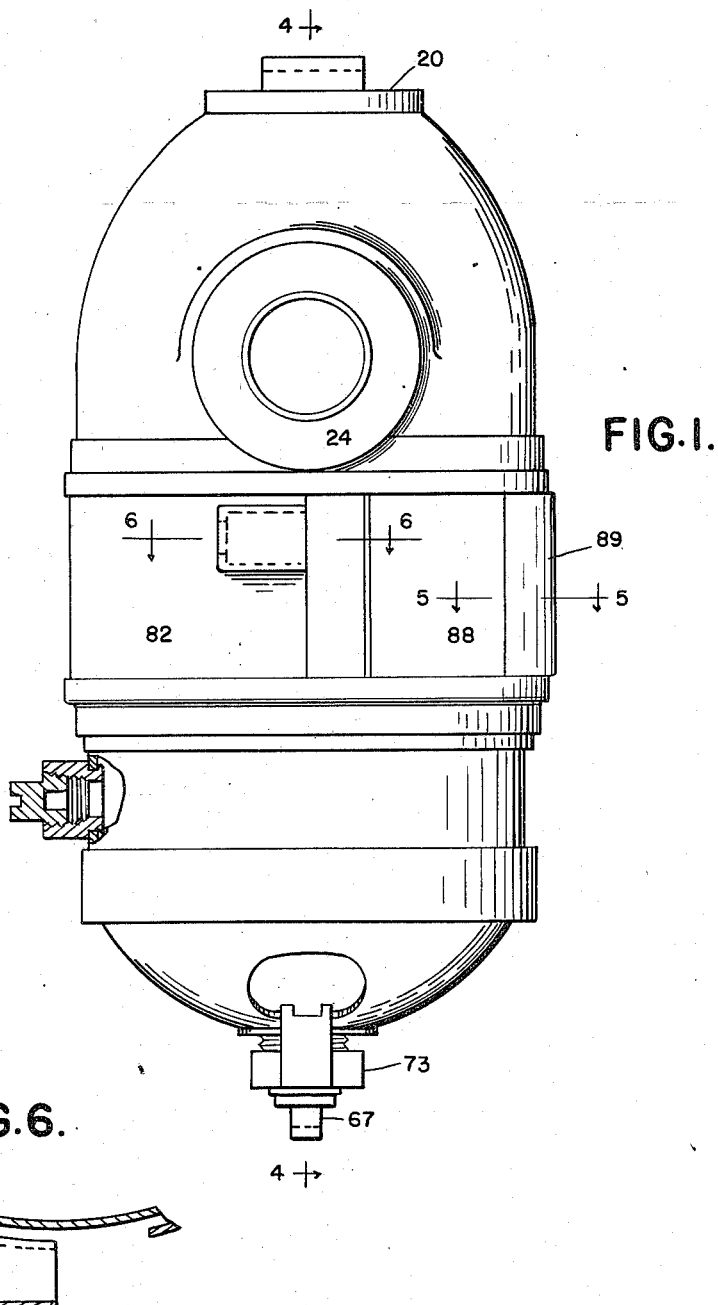
Fig. 6 is a section on line 6—6 of Fig. 1.

Referring to the drawings, and first to Figs. 1 to 6 inclusive, the numeral 15 designates generally a housing which is built up from sheet metal. The housing 15 includes a cylindrical body 16 which is formed at its upper end with a dome-shaped top wall 17 provided with an annular flange 18 terminating in a depending vertical flange 19. A coupling nut or socket 20 is disposed within the vertical flange 19, being provided with interior threads 21 for connection to a pipe, the connection 20 being an outlet connection. The coupling 20 is adapted to be firmly held in the upper end of the housing 15 by crimping a portion of the body of the coupling 20, as indicated at 22. This coupling member 20 may also be brazed, welded or otherwise firmly secured within the flange 19.

The body 16 of the housing is formed at a point slightly below the dome-shaped top portion 17 with an inwardly projecting annular flange 23 in which an intake coupling member 24 is adapted to be fixed. The coupling member 24 is formed with an annular inner portion 25 which has the inner end thereof crimped over as at 26 so as to tightly hold the coupling member 24 within the flange 23. If desired, the coupling member 24 may be welded, brazed or otherwise securely sealed within the flange 23. The dome-shaped portion 17 is formed at one side of the outlet coupling member 20 with an upwardly offset boss 27 to which a nipple or coupling member 28 is secured. The coupling member 28 is formed with interior threads 29, and a removable plug 30 is mounted in the coupling member 28.

The body 16 is formed of sheet metal and has secured within the lower portion thereof with a cylindrical extension 31. The extension 31 telescopes upwardly into the body 16 and may be brazed, welded or otherwise securely sealed in the lower portion of the body 16. The extension 31 is preferably of a thickness slightly greater than the thickness of the body 16 and is formed at its lower end with an inwardly projecting flange 32 which has formed integral therewith an upwardly and inwardly offset annular seat 33. A relatively short cylindrical sleeve 34 is welded, brazed or otherwise firmly secured about the lower portion of the sleeve or extension 31 and is formed at its lower end with an inwardly projecting flange 35. The flange 35 is preferably formed with a series of circumferentially spaced apart cutouts 36, as shown in Fig. 3, so as to thereby form inwardly projecting tongues for detachably holding a pressure cap 37 on the lower portion of the housing.

The cap 37 is cup-shaped and is formed with a plurality of circumferentially spaced apart flanges 38 for engagement with the flanges or tongues 35. The flanges 38 are of such a length as to be freely inserted between the adjacent ends of the flanges or tongues 35.

A strainer generally designated as 40 is removably disposed within the interior of the housing 15 and comprises a cylindrical reinforcing screen member 41 which engages about an inner cylindrical screen member 42. The two screen members 41 and 42 are connected together at their upper ends by a coupling ring 43 which is U-shaped in transverse section with the bight thereof uppermost. The housing 15 within the dome-shaped portion 17 thereof has a screen retainer comprising a dome-shaped upper portion 46 which is formed with a top portion 47 engaging on the inner side of the flat portion 18, and the top portion 47 is formed with a depending flange 48 engaging on the inner side of the depending flange 19. The retainer is also formed with a substantially cylindrical body 49 extending downwardly from the dome-shaped portion 46 and an outwardly extending annular flange 50 is formed integral with the lower end of the cylindrical body 49. A depending annular flange 51 extends downwardly from the annular flange 50 and is formed with a flared lower portion 52 to facilitate the insertion of the strainer member 40 within the retainer. The bight is adapted to be be disposed in confronting position to the annular flange 50 of the retainer. A substantially cone-shaped screen 53 is disposed within the screen 42, having the base thereof secured to the lower end of the screen 42 at a point above the lower end of the screen 41. The outer reinforcing screen 41 projects below the lower ends of the two screen member 42 and 53 and is secured within an annular member 54 which is formed with an inwardly projecting flange 55 and a depending flange 56.

A sump or trap member 57 is disposed in the lower end of the housing 15, closing the latter and comprises a cup-shaped body 58 which is formed with an annular upwardly extending flange 59. An annular member 60 is secured in any suitable manner about the outer side of the flange 59 and the annular member 60 is formed with an annular outwardly extending flange 61. A sealing gasket 62 is adapted to be interposed between the flange 61 and the seat 33 so as to thereby seal the lower end of the housing 15. The flange 56 of the reinforcing ring 54 is disposed within the flange 59 and the horizontal flange 55 rests upon the upper end of the flange 59.

The trap or sump 57 is formed in the center thereof with a depending flange 63 within which the upper end 64 of a nipple 65 is adapted to be firmly secured. The nipple 65 depends below the trap or sump 57 and is formed at its lower end with interior threads 66 within which a removable plug 67 is adapted to be mounted. The sump or trap 57 is held tightly against the sealing member 62 by means of a threaded tube 68 which rotatably engages about the nipple 65. The threaded member 68 is threaded through a nut 69 which is formed with an annular extension 70 crimped, as at 71, to the lower portion of the cap 37.

The threaded member 68 at its lower end is formed with a polygonal nut portion or head 72 to which a handle 73 is secured. The handle 73 in transverse section is of U-shape and is formed with a polygonal central portion (see Fig. 3) secured as by welding, brazing or the like about the head 72 of the threaded tubular pressure applying member 68.

The drain nipple 65 at its lower portion is provided with an annular groove within which a split locking ring 98 is adapted to engage. The ring 98 is disposed below the handle 73 and rotatably holds the handle 73 on the drain nipple 65.

Figure 4:
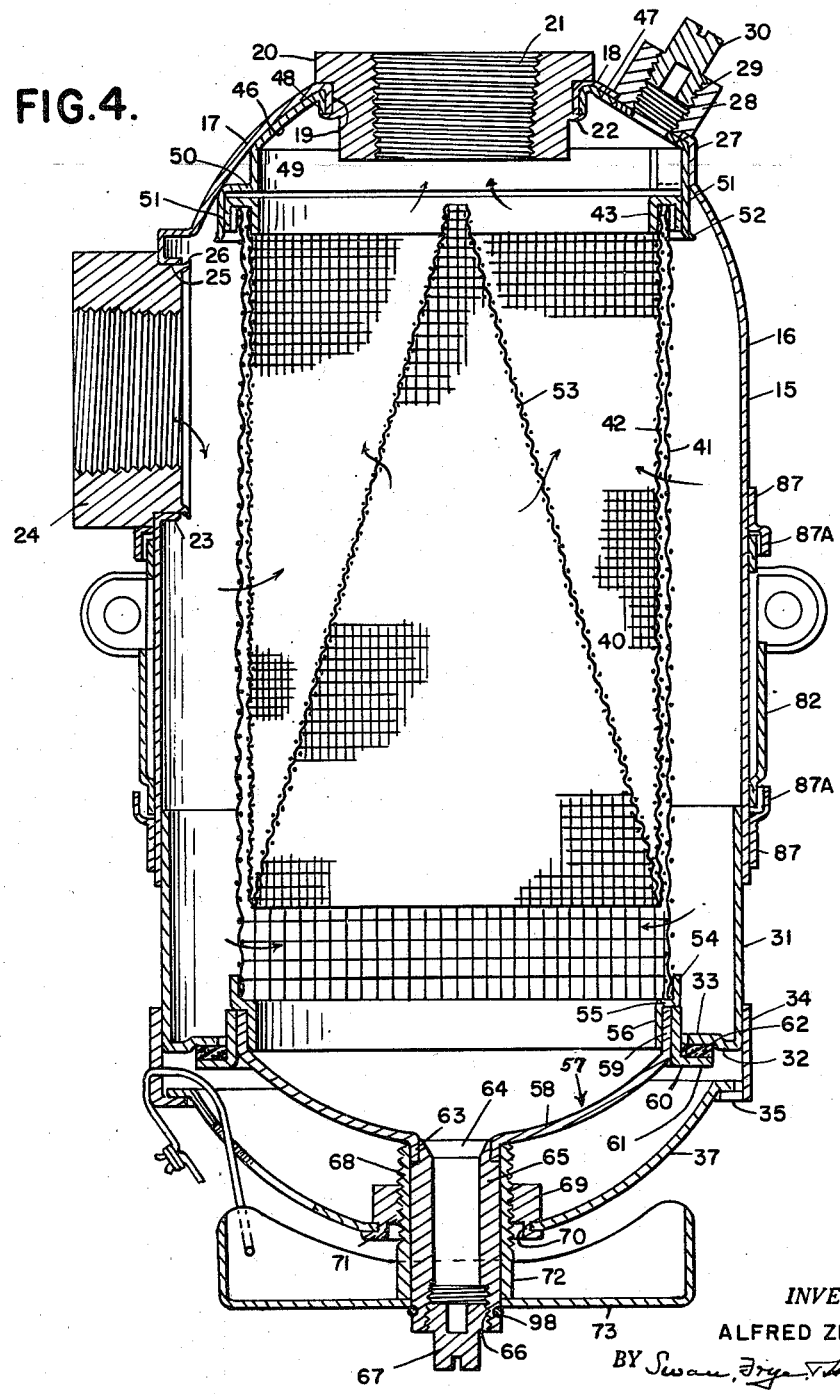
Fig. 4 is a sectional view taken on the line 4—4 of Fig. 1.

As shown in Figs. 1 and 4, the band 82 is circumferentially slidably mounted on the body by means of upper and lower flanged track members 87 which are fixed to the outer wall of the body and provided with elevated flange portions 87A under which lie the edges of the band 82.

Also carried in the track members 87 is a base pad 88 which consists of a strip or band of somewhat less length than the distance between the ends of band 82 and has formed from the central portion thereof of the flat base 89 shown as produced by punching out a portion with an outwardly extending flange 89A and turning in the latter to produce a rounded edge 89B.

Mounted slidably in the track members 87, the pad 88 and band 82 may be moved circumferentially so as to mount the filter with the inlet at any desired radial location.

With a strainer construction as hereinbefore described, it is not necessary to provide right and left connections to the housing as where the attaching ears for the housing are formed integral with or fixed thereto.

A strainer assembly as hereinbefore described may be constructed in great part out of stamped sheet metal which may be secured together in the manner hereinbefore described, thus providing a relatively light strainer assembly which will not leak and which is so constructed that the screen structure on the interior thereof may be readily removed for cleaning or repair and the sump or trap may also be removed for cleaning other purposes.

This assembly has been particularly designed for use in airplanes where reduction of weight is a necessary factor and also where reduction in the quantity of metal used is an important factor at this time.

The assembly hereinbefore described is designed for the filtering of any suitable fluid, several examples being gasoline, and lubricating or other oils. The terms "strainer means" and "screen means" as used in the claims are interpreted as being any suitable filter element formed of either fine mesh screen or other suitable filtering material.

I claim:

1. A strainer structure comprising a housing formed of a cylindrical body, a top wall and a trap removably secured to the bottom of said body, said housing having inlet and outlet ports, strainer means in said housing, opposed channeled retainer members carried by the outer side of said body, and a supporting means engageable in said retainer members.

2. A strainer structure comprising a housing formed of a cylindrical body, inlet and outlet connections carried by said body, a cylindrical extension fixed to and depending from said body, an inwardly projecting annular seat integral with said extension, a sleeve fixed to and depending from said extension and extending to below said seat, a plurality of circumferentially spaced apart inwardly projecting tongues carried by the lower end of said sleeve, a cup-shaped trap engageable against the under side of said seat, a clamping cap for said trap, outwardly directed circumferentially spaced apart tongues carried by said cap and adapted to engage the upper side of said first tongues, a drain nipple carried by said trap, a nut carried by said cap about said nipple, a threaded tubular pressure member rotatable about said nipple and threaded through said nut, means rotatably locking said pressure member on said nipple, and a handle carried by said pressure member whereby to force said trap against said seat when said tongues are in engagement.

ALFRED ZECH.

REFERENCES CITED

The following references are of record in the file of this patent:

UNITED STATES PATENTS

| Number | Name | Date |
|---|---|---|
| 2,277,737 | Wilkinson | Mar. 31, 1942 |
| 2,068,282 | Strindberg | Jan. 19, 1937 |
| 1,582,723 | Ahlman | Apr. 27, 1926 |
| 1,570,052 | Erwin | Jan. 19, 1926 |
| 1,788,464 | Kederis et al. | Jan. 13, 1931 |
| 2,238,003 | Wilkinson | Apr. 9, 1941 |
| 2,277,738 | Wilkinson | Mar. 31, 1942 |
| 1,477,885 | Lehmann | Dec. 18, 1923 |
| 1,579,485 | Piccirilli | Apr. 6, 1926 |
| 1,821,707 | Hasley | Sept. 1, 1931 |
| 2,326,691 | Schum | Aug. 10, 1943 |
| 1,436,294 | Scott | Nov. 21, 1922 |
| 1,755,912 | Carlisle | Apr. 22, 1930 |

FOREIGN PATENTS

| Number | Country | Date |
|---|---|---|
| 497,020 | Great Britain | Dec. 12, 1938 |